United States Patent
Hatae et al.

(10) Patent No.: US 8,824,683 B2
(45) Date of Patent: Sep. 2, 2014

(54) RECORDING MEDIUM, AUTHORING DEVICE, AND AUTHORING METHOD

(75) Inventors: Ryoju Hatae, Tokyo (JP); Yoshihiro Mori, Sherman Oaks, CA (US); Yasushi Uesaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 1757 days.

(21) Appl. No.: 11/911,409

(22) PCT Filed: Apr. 27, 2006

(86) PCT No.: PCT/JP2006/308873
§ 371 (c)(1),
(2), (4) Date: Oct. 16, 2008

(87) PCT Pub. No.: WO2006/120921
PCT Pub. Date: Nov. 16, 2006

(65) Prior Publication Data
US 2009/0041248 A1    Feb. 12, 2009

Related U.S. Application Data

(60) Provisional application No. 60/676,844, filed on May 2, 2005.

(51) Int. Cl.
| | | |
|---|---|---|
| G06F 21/00 | (2013.01) | |
| G11B 20/00 | (2006.01) | |
| H04L 9/32 | (2006.01) | |
| H04L 9/08 | (2006.01) | |
| G11B 20/12 | (2006.01) | |

(52) U.S. Cl.
CPC ....... *G11B 20/00123* (2013.01); *H04L 2209/08* (2013.01); *G11B 20/0021* (2013.01); *G11B 2220/2541* (2013.01); *G11B 20/00086* (2013.01); *H04L 9/3247* (2013.01); *H04L 2209/60* (2013.01); *G11B 2020/1288* (2013.01); *G11B 20/00492* (2013.01); *H04L 9/0891* (2013.01)
USPC ........................................................ 380/277

(58) Field of Classification Search
USPC ........................................................ 380/277
See application file for complete search history.

(56) References Cited

U.S. PATENT DOCUMENTS

| | | | |
|---|---|---|---|
| 2003/0151991 A1* | 8/2003 | Kitani et al. | 369/47.13 |
| 2004/0073806 A1 | 4/2004 | Zimmer | |
| 2004/0190389 A1* | 9/2004 | Nakano et al. | 369/30.03 |

(Continued)

FOREIGN PATENT DOCUMENTS

| | | |
|---|---|---|
| JP | 2002-74835 | 3/2002 |
| JP | 2004-311003 | 4/2004 |

(Continued)

OTHER PUBLICATIONS

Taiwan Application No. 095115288 Office Action dated Jun. 29, 2012, 4 pages.

*Primary Examiner* — Vu Le
*Assistant Examiner* — Tracy Mangialaschi

(57) ABSTRACT

A recording medium has authoring data recorded thereon. The authoring data has a plurality of formats. Data items common to all the plurality of formats include, a content, a content key for encrypting the content, a hash value of the content, a media key for encrypting the content key, and revocation information for revoking an unauthorized device from using the media key. The plurality of formats include a first format and a second format. In the first format, the content is not encrypted and each of the content key, the hash value, the media key, the revocation information is dummy data. In the second format, the content is encrypted and each of the media key and the revocation information is dummy data.

6 Claims, 14 Drawing Sheets

| Data Type | Type1-A | Type1-B | Type2-A | Type2-B |
|---|---|---|---|---|
| Content | Non-Encrypted | Encrypted | Encrypted | Encrypted |
| Content Key | Dummy | Non-Encrypted | Non-Encrypted | Encrypted |
| Hash | Dummy | Non-Dummy | Non-Dummy | Non-Dummy |
| Media Key | Dummy | Dummy | Non-Dummy | Non-Dummy |
| Revocation Information | Dummy | Dummy | Non-Dummy | Non-Dummy |

(56) References Cited

U.S. PATENT DOCUMENTS

2005/0114295 A1* 5/2005 Takashima ................ 707/1
2005/0129067 A1* 6/2005 Bertram et al. ............ 370/477
2007/0033419 A1* 2/2007 Kocher et al. ............. 713/193

FOREIGN PATENT DOCUMENTS

| JP | 2006-72688 | 3/2006 |
| TW | 200414051 | 8/2004 |
| WO | WO 2005/002232 | 1/2005 |

* cited by examiner

FIG. 2

| Data Type | Type1-A | Type1-B | Type2-A | Type2-B |
|---|---|---|---|---|
| Content | Non-Encrypted | Encrypted | Encrypted | Encrypted |
| Content Key | Dummy | Non-Encrypted | Non-Encrypted | Encrypted |
| Hash | Dummy | Non-Dummy | Non-Dummy | Non-Dummy |
| Media Key | Dummy | Dummy | Non-Dummy | Non-Dummy |
| Revocation Information | Dummy | Dummy | Non-Dummy | Non-Dummy |

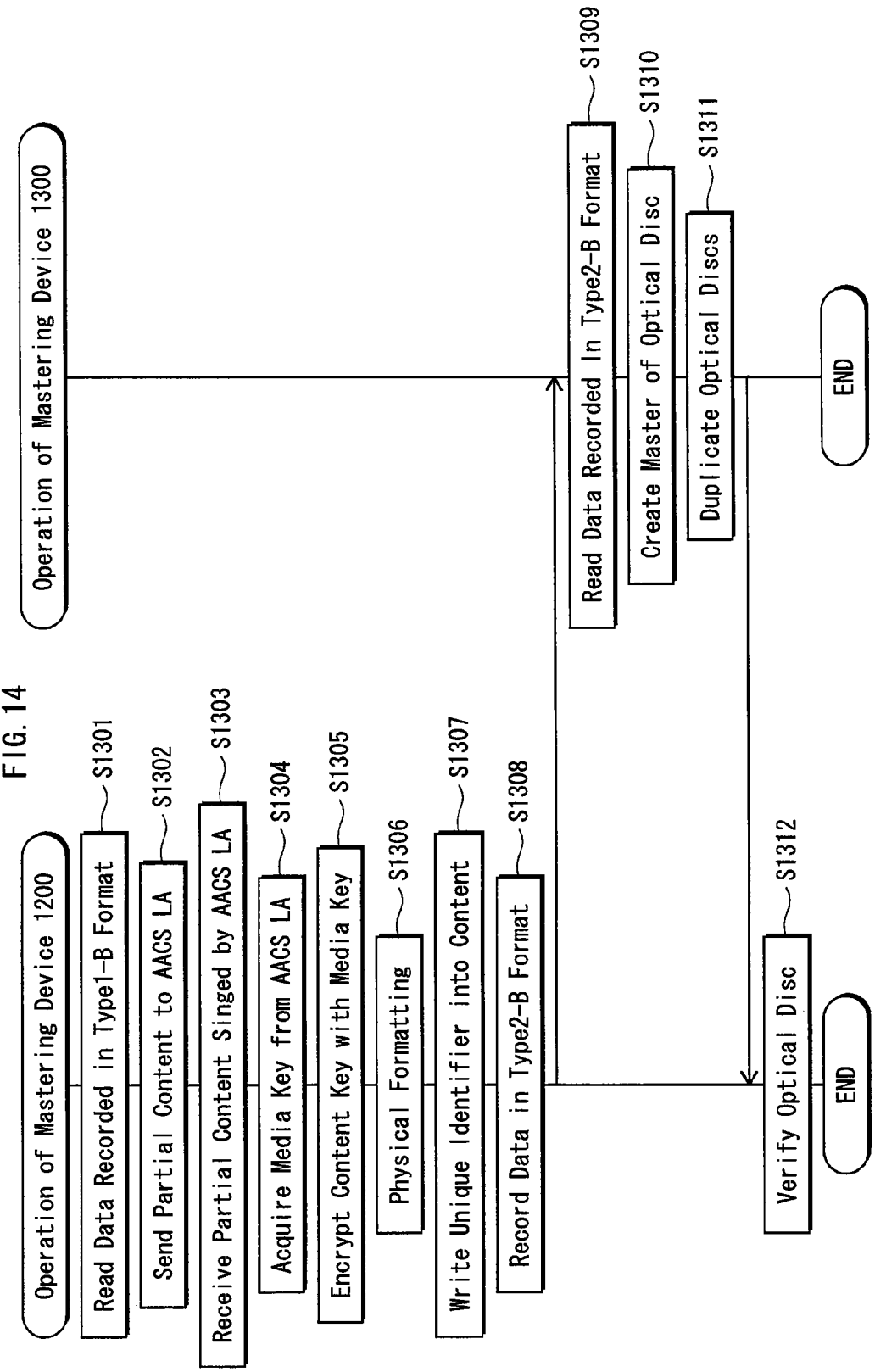

RECORDING MEDIUM, AUTHORING DEVICE, AND AUTHORING METHOD

TECHNICAL FIELD

The present invention relates to an authoring technique for optical discs and especially relates to the data format of authoring data to be recorded onto a recording medium.

BACKGROUND ART

Authoring is a process of designing the application layer format of an optical disc before producing a master optical disc. More specifically, the authoring process involves generating a volume image, which is information having a predetermined format, and recording the volume image on a recording medium. The volume image contains a digital stream compressed and encoded according to the MPEG (Moving Picture Experts Group) standard and also contains a scenario of the digital stream.

Some of authoring processes known in the art are designed for read-only DVDs (generally referred to as "DVD-Video"). When producing an original maser of DVD-Video, an authoring sited does not encrypt the digital stream and scenario. Rather, the authoring site indicates to a mastering site that the digital stream and scenario are requested to be encrypted. Instead of the indication, the authoring site may simply provide a key to be used for the encryption. In either case, the encryption is carried out by the mastering site not by the authoring site. That is to say, the volume image formatted for DVD-Video is non-encrypted. The reason for not encrypting at the authoring site is that the encryption system generally employed for DVD-Video is CSS (content scramble system) according to which the data size remains the same before and after the encryption. In addition, it is more efficient to perform the encryption at the mastering site. If the encryption is performed at the authoring site, the mastering site is required to go through a decryption process in order to verify the encrypted data.

Unfortunately, however, data encrypted by CSS is readily decryptable once a correct key is obtained and thus the copyright protection provided by CSS may not be sufficient.

For read-only Blu-ray Disc ROM (hereinafter "BD-ROM") that are expected to be available in the near future, AACS (advanced access content system) is employed for encryption in order to provide more robust copyright protection. AACS provides robust protection by various functions, including addition of a hash value, use of a signature, and device revocation.

See Patent Document 1: WO2005/002232

DISCLOSURE OF THE INVENTION

Problems the Invention is Attempting to Solve

Unfortunately, however, various problems would arise if AACS is employed for protecting BD-ROM volume image that is generated in the same format as the conventional volume image format for DVD-Video. Currently, there is no optimal format for a BD-ROM volume image.

The reason for causing the problems lie in the difference between encryption systems employed for DVD-Video and BD-ROM. As described above, according to CCS employed for DVD-Video, the data size remains the same before and after encryption. Thus, the authoring site is allowed to generate a stream that would occupy the maximum available capacity of a disc and supplies the resulting authoring data to the mastering site, without a risk that the authoring data comes to exceed the capacity and cannot be recorded onto the disc. However, AACS employed for BD-ROM involves encryption and signature generation. Thus, the data size increases due to addition of a hash value, for example. If the authoring site generates a stream that would occupy the maximum available capacity of a disc and supplies the resulting authoring data to the mastering site, it is inevitable that the authoring data after processing by the mastering site increases in size and cannot be recorded onto the disc. In such a case, the authoring process needs to be redone.

In addition, even if the final size of the authoring data falls within the available capacity, the storage locations of data items and files have been shifted because of the additional data. Consequently, it is necessary to update file management information that indicates the addresses in the file system and to verify the relations among data locations.

The problems noted above may be avoided by encrypting authoring data at the authoring site and supplies the encrypted authoring data to the mastering site. However, it should be noted that some authorizing sites, especially those with limited capital, may not be able to obtain a license for implementing AACS. In view of this, it is not desirable that available choice of volume image formats are limited to a format that requires AACS processing, such as encryption and signature generation.

The present invention is made in view of the above, and aims to provide a recording medium having a volume image recorded thereon in a format ensuring, in consideration of the AACS characteristics, that the data size remains the same even if the logical data size increases. The present invention also aims to provide an authoring device and an authoring method that ensures substantially the same effect as the recording medium.

Means for Solving the Problems

In order to achieve the above aim, the present invention provides a recording medium having authoring data recorded thereon. The authoring data has a plurality of formats. Data items common to all the plurality of formats include, a content, a content key for encrypting the content, a hash value of the content, a media key for encrypting the content key, and revocation information for revoking an unauthorized device from using the media key. The plurality of formats include a first format in which the content is not encrypted and each of the content key, the hash value, the media key, the revocation information is dummy data. The plurality of formats include a second format in which the content is encrypted and each of the media key and the revocation information is dummy data.

Dummy data of the content key, hash value, media key, and revocation information may be any data that is irrelevant to the respective data items. Dummy data may be a meaningless data string.

Effects of the Invention

According to the recording medium of the present invention, authoring data in the first format contains pieces of dummy data for a content key, hash value, media key, and revocation information. When the mastering site generates a content key and a hash value and acquires a media key and revocation information, those actual data items are replaced with the respective pieces of dummy data stored on the recording medium, without any increase in data size. Thus, it is avoided that the authoring data increases in size and cannot fit into the disc. In addition, the present invention eliminates the need to update the address information of the file system and the consequent need to verify the data layout again.

According to the recording medium of the present invention, authoring data recorded in the second format contains pieces of dummy data for a media key and revocation information. When the mastering site acquires a media key and revocation information, the acquired data items are replaced with the respective pieces of dummy data recorded on the recording medium, without any increase in data size. Thus, it is avoided that the authoring data increases in size and cannot fit into the disc.

In addition, the recording medium according to the present invention is enabled to store authoring data in any of the first and second formats. In other words, the recording medium according to the present invention is enabled to store authoring data regardless of whether or not the authoring site holds an encryption license.

The plurality of formats may include a third format and a fourth format. In the third format, the content is encrypted, the content key is not encrypted, and each of the media key and the revocation information is actual data. In the fourth format, both the content and the content key are encrypted.

With the structure stated above, the recording medium according to the present invention is additionally enabled to store authoring data in any of the third and fourth formats. That is to say, the present invention permits that the authoring data is recorded in a suitable format in view of the facilities and capabilities of the authoring site and the mastering site.

In another aspect, the present invention provides an authoring device for generating and recording authoring data onto a recording medium. Data items of the authoring data include a content key for encrypting a content, a hash value of the content, a media key for encrypting the content key, and revocation information for revoking an unauthorized device from using the media key. The authoring device includes: a dummy generating unit operable to generate dummy data for each of the content key, the hash value, the media key, and the revocation information; an authoring data generating unit operable to generate authoring data that contains the generated dummy data; and a recording unit operable to record the generated authoring data onto the recording medium.

The dummy generating unit may store, in advance, data size information of the media key and of the revocation information, and may be operable to generate the dummy data for each of the media key and the revocation information based on the data size information and to generate the dummy data for each of the content key and the hash value based on the content.

With the structure stated above, the dummy generating unit generates in advance pieces of dummy data for respective data items, namely a content key, hash value, media key, and revocation information, which are to be later added through the processing performed at the mastering site. The authoring data generating unit generates authoring data containing the thus generated dummy data. The dummy data is replaced with the actual data by the mastering site. Thus, it is avoided that the authoring data cannot fit into the disc.

In yet another aspect, the present invention provides an authoring device for generating and recording authoring data onto a recording medium. Data items of the authoring data include a content key for encrypting a content, a hash value of the content, a media key for encrypting the content key, and revocation information for revoking an unauthorized device from using the media key. The authoring device includes: a dummy generating unit operable to generate dummy data for each of the media key and the revocation information; an authoring data generating unit operable to generate authoring data that contains the generated dummy data; and an encrypting unit operable to generate a content key for encrypting the content, to encrypt the content with the generated content key, and to generate a hash value of the encrypted content. The content contained in the authoring data generated by the authoring data generating unit has been encrypted by the encrypting unit.

The dummy generating unit may store, in advance, data size information of the media key and of the revocation information, and may be operable to generate the dummy data based on the data size information.

With the structure stated above, the dummy generating unit generates in advance pieces of dummy data for respective data items, namely a media key and revocation information, which are to be later added through the processing performed at the mastering site. The encrypting unit generates a content key, encrypts the content, and generates a hash value of the content. The authoring data generating unit generates authoring data containing the thus generated dummy data. The dummy data is replaced with the actual data by the mastering site. Thus, it is avoided that the authoring data cannot fit into the disc.

BRIEF DESCRIPTION OF THE DRAWINGS

FIG. 2 illustrates data types in relation to each of a plurality of format types;

FIG. 14 is a flowchart of operation of mastering devices 1200 and 1300.

Figure 1:
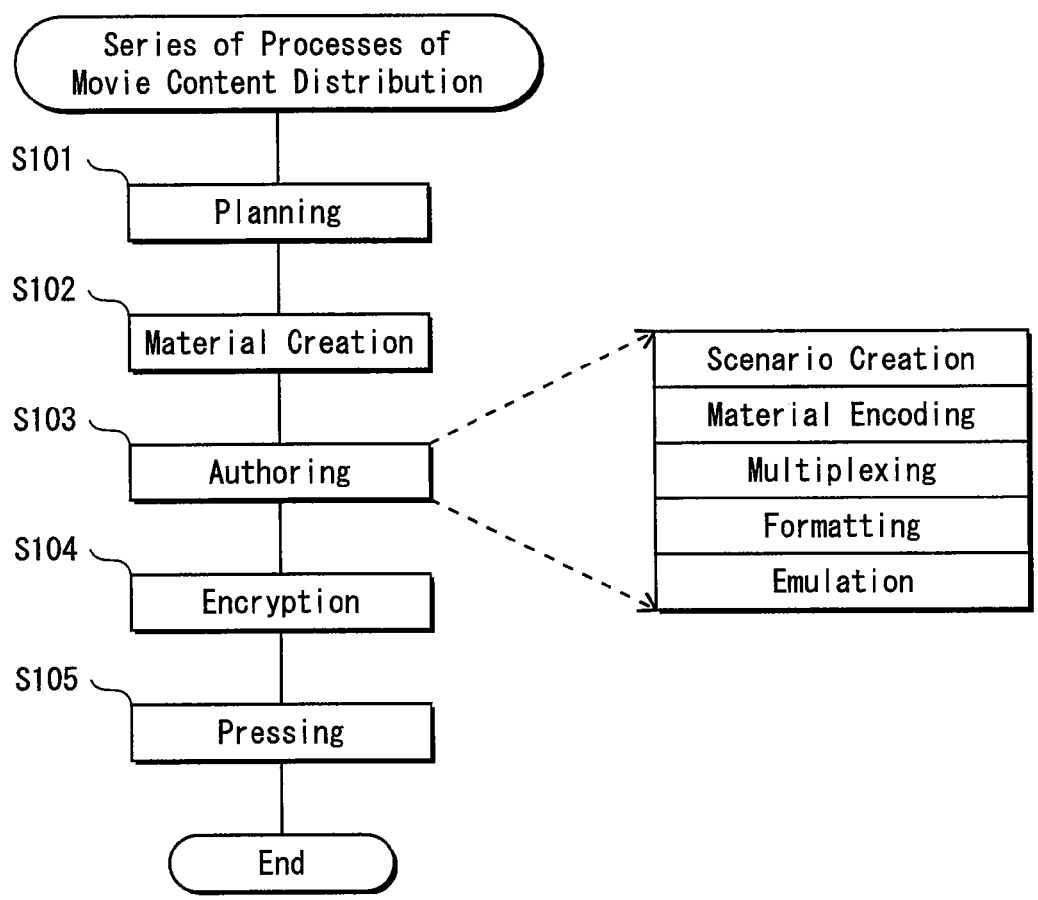
FIG. 1 is a view illustrating processes of producing a disk for future distribution of a movie content.

| Reference Numerals | |
| --- | --- |
| 100, 200, 700 | Studio |
| 300, 400, 800 | Authoring Device |
| 500, 900, 1000, 1100, 1200, 1300 | Mastering Device |
| 600 | AACS LA |
| 301, 401, 801 | Authoring Unit |

-continued

| Reference Numerals | |
|---|---|
| 302, 402, 802 | Dummy File Generator |
| 303, 403, 804 | Verifier |
| 304, 405, 806, 1207 | Recorder |
| 404, 805 | Content Encrypting Unit |
| 305, 406, 807 | Encoder |
| 306, 407, 808 | Multiplexer |
| 307, 408, 809 | Formatting Unit |
| 510, 1001, 1101, 1201, 1301 | Reading Unit |
| 501 | Content Encrypting Unit |
| 502, 1002, 1202 | Signature Unit |
| 503, 1003, 1203 | Media Key Acquiring Unit |
| 504, 1102, 1204 | Media Key Encrypting Unit |
| 505, 1103, 1205 | Physical Formatting Unit |
| 506, 1104, 1206 | Identifier Writing Unit |
| 507, 1105, 1302 | Mastering Unit |
| 508, 1106, 1303 | Replication Unit |
| 509, 1004, 1208 | Verifier |
| 803 | Format Setting Unit |

BEST MODE FOR CARRYING OUT THE INVENTION

The following describes embodiments of the present invention, with reference to the accompanying drawings.

First Embodiment

<BD-ROM Producing Process>

First of all, a series of processes of producing a BD-ROM for future distribution of a movie content is described. FIG. 1 is a view illustrating the processes of producing a disk for future distribution of a movie content.

The processes of producing a BD-ROM for further distribution of a movie content includes a planning process of determining a playback sequence of the disk (Step S101), a material creating process, such as recording a moving picture and audio data (Step S102), an authoring process (Step S103), an encrypting process of encrypting the authoring data (Step S104), and a press process of producing a master BD-ROM and completing the BD-ROM by pressing and bonding (Step S105).

Among these processes, the authoring process includes five processes, namely a scenario generating process, a material encoding process, a multiplexing process, a formatting process, and an emulation process.

The scenario generating process is a process of obtaining BD volume composition information.

The material encoding process is a process of encoding video material, audio material, and secondary-video material into elementary streams (i.e., video, audio, and secondary-video streams).

The multiplexing process is a process of interleaving the plurality of elementary streams (i.e., video, audio, and secondary-video streams) that are obtained by material encoding into a single digital stream.

The formatting process is a process of generating various information items based on the BD volume configuration information and converting the scenario and digital stream into a format supported by the BD-ROM.

The emulation process is a process of executing playback of the volume image in order to verify whether or not the authoring is correctly done.

According to the state-of-the-art DVD-Video technique, as described in the "Background Art" section, the processes up to the authoring process are carried out by the authoring site and the encryption process and the subsequent processes are carried out by the mastering site. That is to say, the series of processes are clearly divided between the two site.

Regarding BD-ROM, however, the AACS encryption is employed. Thus, it is not appropriate to divide the series of processes in the conventional manner and to use the conventional data format for transferring data from the authoring site to the mastering site. In addition, it is not desirable that all the available data formats are limited to such formats that require the authoring site to encrypt the volume image. That is to say, no matter how the series of processes are divided between the authoring and mastering sites, the BD-ROM authoring involves problems. In view of the above, the present invention provides a plurality of formats that can be optionally used depending on various factors, including whether or not the authoring or mastering site holds a license for the encryption.

Next, the following describes, with reference to FIG. 2, the data type and format type. FIG. 2 illustrates the data types in relation to the respective format types.

<Essential Data Types>

Each format defined according to the present invention is composed of the data types as illustrated in FIG. 2, namely a content, a content key, a hash value, a media key, and revocation information.

The content is data carrying a movie content.

The content key is a key used to encrypt the content. The content is sequentially encrypted in units each called "CPS Unit". One CPS Unit corresponds to a title of DVD-Video. The size of each CPS Unit may be arbitrarily determined. For example, one CPS Unit may be stored in a plurality of files or part of a file. The key length is 128 bits, for example.

The hash value is a fixed-length data representing a numeric value derived from a block of data.

The media key is a fixed 128-bit data used to encrypt the content key.

The revocation information is used to revoke unauthorized devices from using the media key. The revocation information needs to be stored on the disc. Yet, the revocation information is not necessary if the content is not encrypted. In addition, the number of unauthorized devices differs depending on the time in which the disc is produced and thus the size of revocation information may differ depending on the time in which the disc is produced. Yet, at a specific time at which the disc is produced, the revocation information has a known fixed-length.

<Format Type>

Next, the following describes a plurality of formats defined according to the present invention.

The present invention defines two data formats called "Type1" and "Type2".

Type 1 is a data format used for data exchange between an authoring site and a mastering site. The type 1 format includes two variations called "Type1-A" and "Type1-B".

As illustrated in FIG. 2, according to the Type1-A format, the content stored in the content file is non-encrypted. Thus, the content key file, the hash value file, the media key file, and the revocation information file each store dummy data. Each piece of dummy data is equal in size to a corresponding one of a content key, a hash value, a media key, and revocation information that are to be generated by the mastering site or acquired from the AACS LA.

The Type1-A format is used in the case where the content needs to be encrypted and signed under an AACS license but the authoring site does not hold the AACS license or where the authoring and the mastering are carried out by the same business entity. The Type1-A format is also used in the case where the operation is verified by an external device.

With the use of the Type1-A format, it is ensured that the data size remains the same even after the mastering site applies encryption to the data received in the Type1-A format and stores a hash value and also after the mastering site acquires a media key and revocation information. Thus, it is avoided that the resulting data cannot be stored onto a disc. In addition, the need to update the address information of the file system is eliminated. As a consequence, the need to repeat verification of the data layout is eliminated.

As illustrated in FIG. 2, according to the Type1-B format, the content stored in the content file is encrypted, whereas the content key stored in the content key file is non-encrypted. Thus, the hash value file stores an actual hash value that is generated from the encrypted content, rather than dummy data. On the other hand, the media key file and the revocation information file each store dummy data.

The Type 1-B format is used in the case where the authoring and the mastering are carried out by separate business entities and the content can be encrypted and signed without an AACS license. The Type1-B format is used in the case where the authoring site holds the AACS license.

With the use of the Type1-B format, it is ensured that the data size remains the same even after the mastering site acquires a media key and revocation information for the data received in the Type1-B format. Thus, it is avoided that the resulting data cannot be stored onto a disc. In addition, since the content is already in encrypted form, a signature is readily acquired from AACS LA by extracting part of the encrypted content and supplies the extracted data to the AACS LA.

Type 2 is a data format for data exchange between a mastering site and a sub-mastering site. The type 2 format includes two variations called "Type2-A" and "Type2-B".

As illustrated in FIG. 2, according to the Type2-A format, the content stored in the content file is encrypted, whereas the content key stored in the content key file is non-encrypted. In addition, the hash value file stores an actual hash value that is generated from the encrypted content, rather than dummy data. Similarly, the media key file and the revocation information file each store actual data acquired from the AACS LA, rather than dummy data.

The Type2-A format is used in the case where the data is supplied to a sub-mastering site for the mastering process and an identifier used by the sub-mastering site has not been determined yet.

As illustrated in FIG. 2, according to the Type2-B format, both the content and the content key are encrypted. Thus, the hash value is not dummy data but actual data generated from the encrypted content. Similarly, the media key and the revocation information are actual data acquired from the AACS LA, rather than dummy data.

The Type2-B format is used in the case where the data is supplied to a sub-mastering site for the mastering process and an identifier used by the sub-mastering site has been determined.

Figure 3:
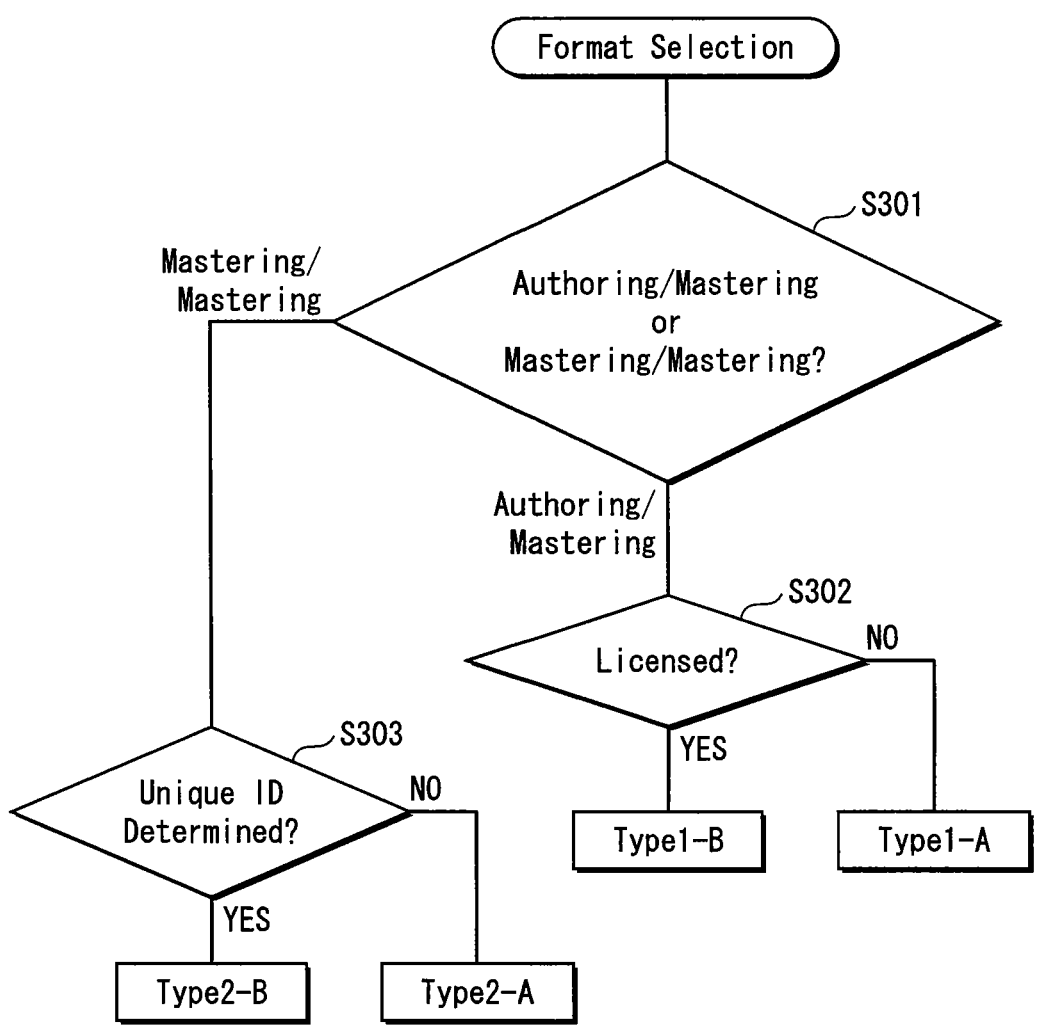
FIG. 3 is an exemplary flowchart of processing to select a suitable one of the plurality of format.

FIG. 3 is an exemplary flowchart of processing to select a suitable one of the formats described above.

First of all, the data format to be used differs depending on whether data is to be transferred from an authoring site to a mastering site or from a mastering site to a sub-mastering site (Step S301). For the data to be transferred from an authoring site to a mastering site, the Type1 format is used. Furthermore, the data format to be used further differs depending on whether or not the authoring site holds an encryption license (Step S302). In the case where the authoring site does not hold an encryption license, the Type1-A is used. On the other hand, in the case where the authoring site holds an encryption license, the Type1-B format is used. For the data to be transferred from a mastering site to a sub-mastering site, the Type2 format is used. The data format to be used further differs depending on whether or not an identifier to be used by the sub-mastering site has been determined (Step S302). In the case where the identifier has not been determined, the Type2-A format is used. On the other hand, in the case where the identifier has been determined, the Type2-B format is used.

<BD-ROM>

Figure 4:
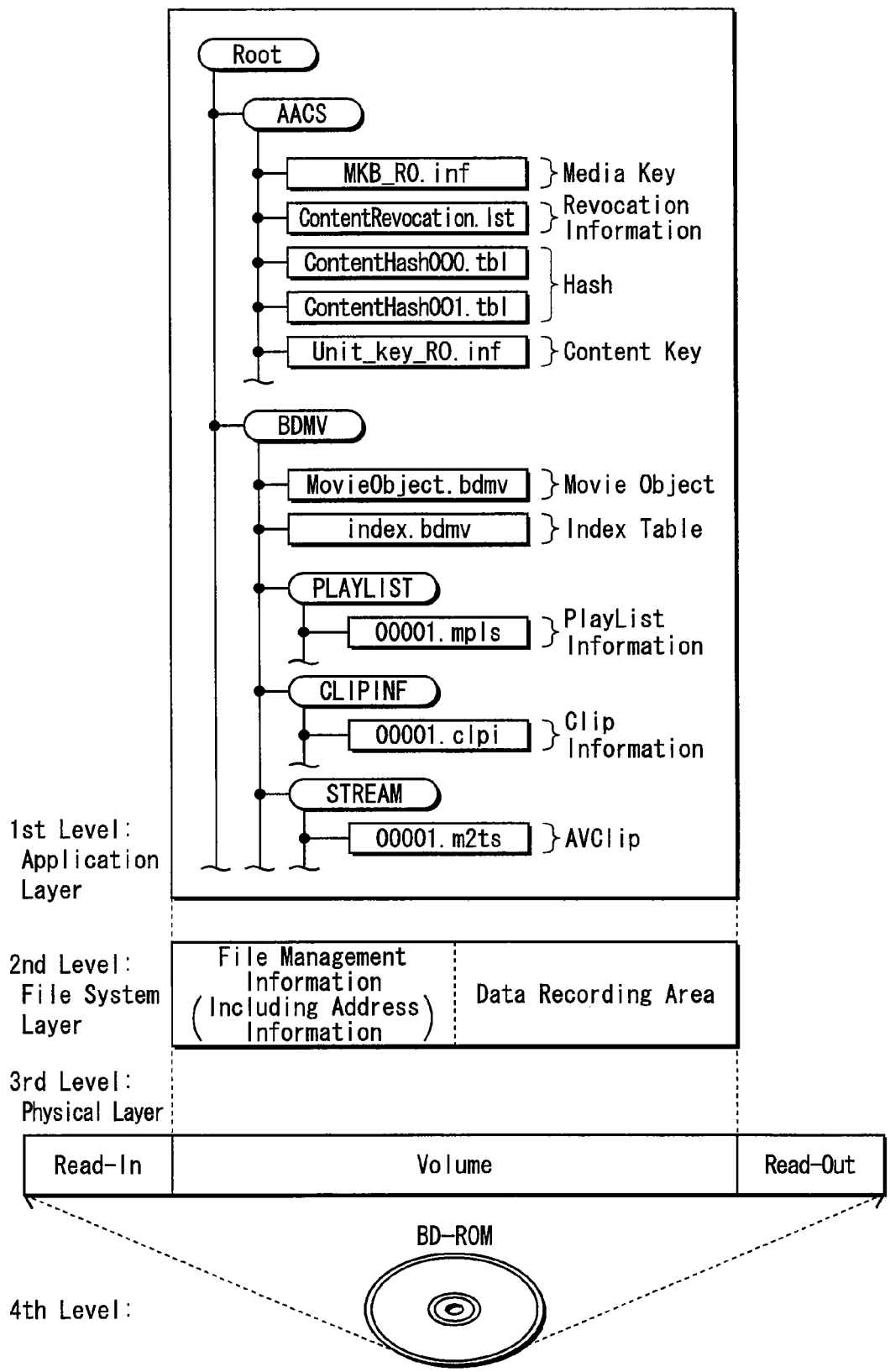
FIG. 4 illustrates the internal structure of a BD-ROM.

FIG. 4 illustrates the internal structure of a BD-ROM. In the figure, the $4^{th}$ level shows the BD-ROM, the 3rd level shows the track of the BD-ROM, and the $2^{nd}$ level shows the file system layer. The file system layer includes a storage area for file data and also includes file management information. The file management information includes address information. Note that the track laterally extends in the figure but in practice the track spirals outwards from the center of the BD-ROM. The track is composed of a lead-in area, a volume area, and a lead-out area. The volume area illustrated in the figure has a layer model of a physical layer, a file system layer, and an application layer. The $1^{st}$ level shows, in a directory structure, a format of the application layer (application format) of the BD-ROM. As illustrated, the BD-ROM has a ROOT directory, and the ROOT directory has an AACS directory and a BDMV directory.

The AACS directory contains files called MKB_RO.inf (media key file), ContentRevocatin.lst (revocation information file), ContentHash000.tbl (hash value file), ContentHash001.tbl (hash value file), and Unit_key_RO.inf (content key file).

The MKB_RO.inf file is for storing a media key.

The ContentRevocatin.lst file is for storing revocation information. The ContentHash000.tbl file and the ContentHash001.tbl file are each for storing a hash value. The hash values are stored on the respective layers of the BD-ROM.

The Unit_key_RO.inf file is for storing a content key. As many content keys as the number of CPS Units, which are the units of encryption, are concatenated into a single string and stored into a single file.

The BDMV directory contains three sub-directories called a PLAYLIST directory, a CLIPINF directory, and a STREAM directory. In addition, the BDMV directory contains files called index.bdmv and MovieObject.bdmv.

The PLAYLIST directory contains a file with extension "mpls" (00001.mpls). Each file with extension "mpls" (such as 00001.mpls) is a file for storing PlayList information that defines a PlayList referencing AV clips.

The CLIPINF directory contains a file with extension "clpi" (00001.clpi). Each file with extension "clpi" (00001.clpi) stores Clip information that is provided in one-to-one correspondence with an AV Clip.

The STREAM directory contains files constituting the main part of a digital stream. More specifically, the STREAM directory contains a file with extension "m2ts" (00001.m2ts). Each file with extension "m2ts" (such as 00001.m2ts) stores an AV Clip.

The index.bdmv file stores management information relating to the entire BD-ROM. More specifically, the management information includes an organization ID that identifies the provider of the movie content, a disc ID uniquely assigned to the individual BD-ROM provided by the provider, and the like. When the BD-ROM is inserted into a playback apparatus, the index.bdmv file is read first, so that the disc is uniquely identified.

The MovieObject.bdmv file stores a plurality of PlayList playback commands for sequentially executing playback of a plurality of PlayLists.

<Structure>

The following describes a system according to the present invention.

Figure 5:
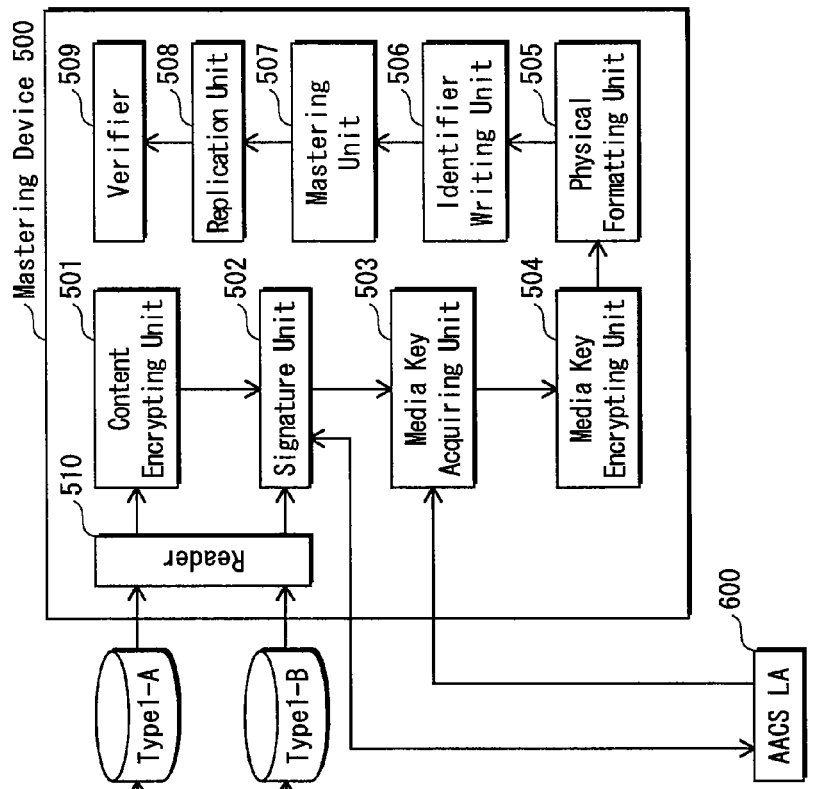
FIG. 5 illustrates the structure of a system according to the present invention and also illustrates the internal structure of devices included in the system.
Figure 5:
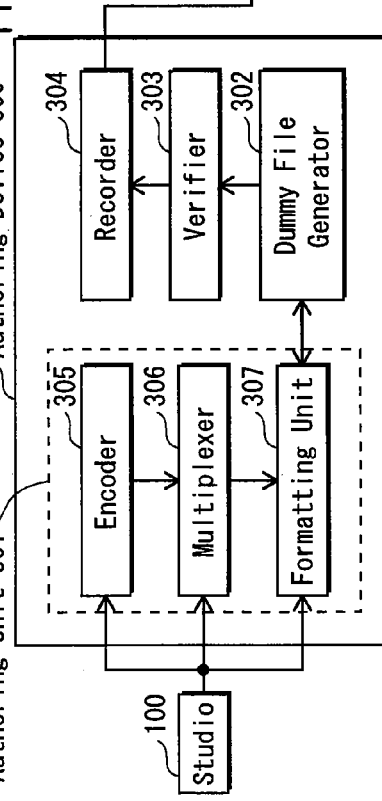
Figure 5:
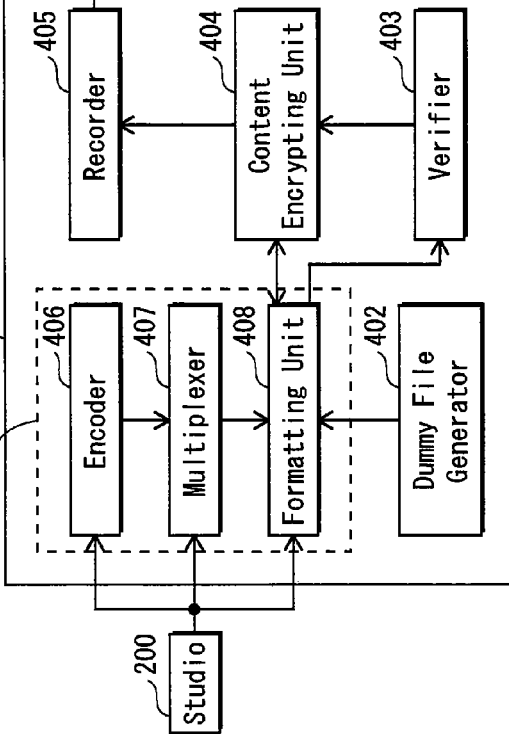

FIG. 5 illustrates the structure of a system is generally composed of studios 100 and 200, authoring devices 300 and 400, a mastering device 500, and AACS LA (AACS Licensing Administrator) 600. FIG. 5 also illustrates the internal structure of the authoring devices 300 and 400 as well as of the mastering device 500.

The studio 100 creates material by, for example, recording a moving picture and audio data, and outputs the material to an encoder 305 of the authoring device 300. In addition, the studio 100 generates a scenario for BD-ROM in accordance with user operations, and outputs the scenario to a formatting unit 307 of the authoring device 300. The scenario is composed of an Index Table, an Movie Object, a PlayList, and Clip Information. In addition, the studio 100 generates a multiplexing parameter and outputs the multiplexing parameter to a multiplexer 306 of the authoring device 300.

The authoring device 300 records the data in the Type1-A format.

The authoring device 300 is composed generally of an authoring unit 301, a dummy file generator 302, a verifier 303, and a recorder 304. The authoring unit 301 includes the encoder 305, the multiplexer 306, and the formatting unit 307.

The encoder 305 encodes the material received from the studio 100, so that a video stream, an audio stream, an interactive graphics stream, and a presentation graphics stream are acquired. The encoder 305 generates a video stream comparable in image quality to high-vision image by allocating a bit rate higher than 10 Mbps per second.

The multiplexer 306 multiplexes a plurality of different elementary streams into an MPEG2-TS digital stream. The plurality of elementary streams include the video stream, audio stream, the interactive graphics stream, the presentation graphics stream that are generated by the encoder 305. The multiplexing is carried out by the multiplexer 306 in accordance with the multiplexing parameter supplied from the studio 100, so that an MPEG2-TS digital stream is acquired. An MPEG2-TS digital stream is called an AV Clip.

Figure 6:
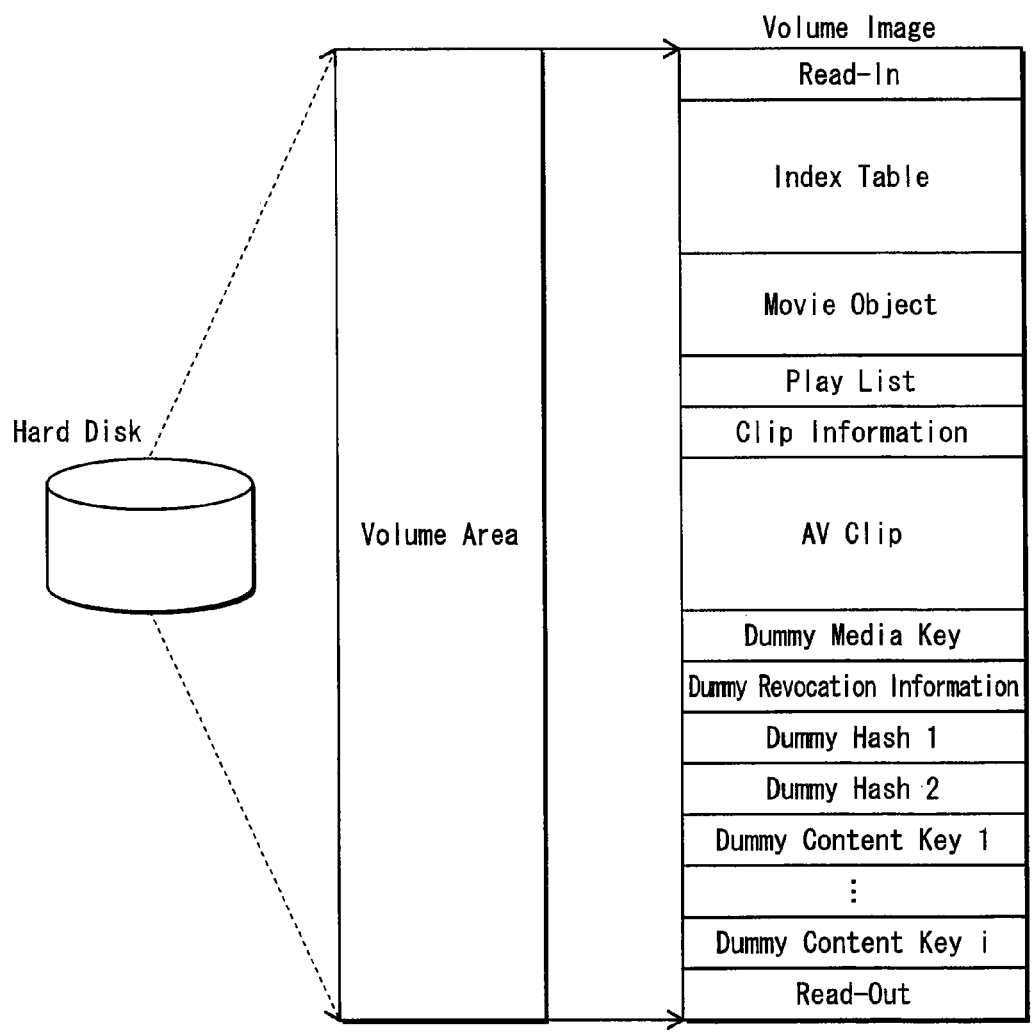
FIG. 6 illustrates the relation between a scenario generated by a studio 100 and a volume image to be supplied to a mastering site.

The formatting unit 307 generates a volume image by assigning track addresses to the scenario supplied from the studio 100 and to digital streams. Note that each track address identifies a location on the BD-ROM track that spirals outwards. FIG. 6 illustrates the relation between the scenario generated by the studio 100 and the volume image to be supplied to the mastering site. FIG. 6 illustrates a hard disk on the left-hand side, a volume area of the hard disk in the middle, and a volume image stored in the volume area at the right-hand side. The volume image contains the scenario that is composed of an Index Table, a Movie Object, a PlayList, and Clip information, which are all generated by the studio 100. Through the processing by the formatting unit 307, BD-ROM addresses are assigned to the scenario generated by the studio 100, to the AV Clip generated by the multiplexer 306, and to the lead-in and lead-out areas. As a result, the volume image is obtained. In order to obtain the volume image, in addition, the formatting unit 307 also assigns BD-ROM addresses to each piece of dummy data generated by the dummy file generator 302. In FIG. 6, the content key, hash value, media key, and revocation information are dummy data.

The dummy file generator 302 generates a content key file, a hash value file, a media key file, and a revocation information file. The content key file and the hash value file are generated based on the volume image that is generated by the formatting unit 307 and not yet includes dummy data. The media key file and the revocation information file are generated independently of the volume image.

Note that hash values may be generated for individual files. Thus, as many pieces of dummy data as the total number of files are generated and stored into the respective hash value files, so that respective file sizes are adjusted. Note that authentication using a hash value is performed separately on a file-by-file basis.

Note that the media key has a fixed-length and the data size of revocation information is fixed in data size at the time of disc production. The dummy file generator 302 stores the fixed sizes in advance and generates dummy data that is equal in size to the media key and revocation information to be acquired. As a result, the size of media key file and the size of revocation information file are adjusted.

The verifier 303 executes playback of the volume image in order to verify behavior of the volume image.

After the volume image is verified by the verifier 303, the recorder 304 records the volume image onto a recording medium, such as a magnetic tape.

Next, the following describes the authoring device 400.

The authoring device 400 records data in the Type1-B format.

The authoring device 400 is composed generally of an authoring unit 401, a dummy file generator 402, a verifier 403, a content encrypting unit 404, and a recorder 405.

An encoder 406 and a multiplexer 407 of the authoring unit 401 as well as the verifier 403 and the recorder 405 receive input from the studio 200 rather than from the studio 100. Except for that point, the encoder 406, the multiplexer 407, the verifier 403, the content encrypting unit 404, and the recorder 405 are identical in function to corresponding component units of the authoring device 300, namely the encoder 305, the multiplexer 306, the verifier 303, and the recorder 304.

Figure 7:
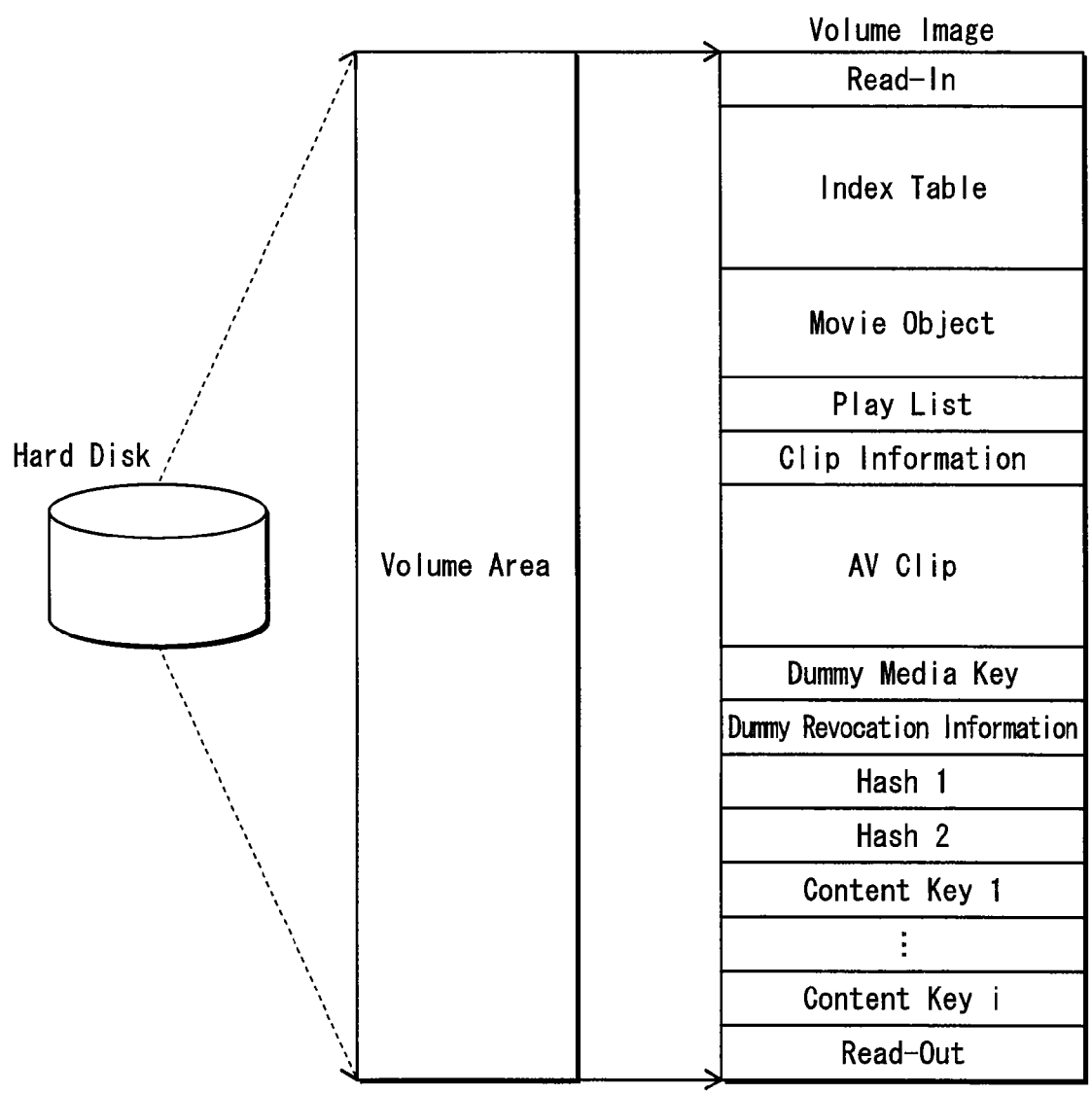
FIG. 7 illustrates the relation between a scenario generated by a studio 200 and a volume image to be supplied to a mastering site.

A formatting unit 408 generates a volume image by assigning track addresses to the scenario supplied from the studio, to digital streams, to the lead-in and lead-out areas, to the content key and hash values generated by the content encrypting unit 404, and to the dummy data generated by the dummy file generator 402. Note that each track address identifies a location on the BD-ROM track that spirals outwards. FIG. 7 illustrates the relation between the scenario generated by the studio 200 and the volume image to be supplied to the mastering site. In FIG. 7, the media key and the revocation information are dummy data.

The dummy file generator 402 generates dummy files one for the media key and one for the revocation information. Note that the media key has a fixed-length and the data size of revocation information is fixed in data size at the time of disc production. The dummy file generator 402 stores the fixed sizes in advance. The dummy file generator 402 dummy data that is equal in size to the media key and revocation information to be acquired. As a result, the size of media key file and the size of revocation information file are adjusted.

The content encrypting unit 404 generates a key used to encrypt the content, encrypts the content by using the thus generated key, and generates a hash value from the encrypted content.

The recorder 405 records authoring data onto a recording medium, such as a magnetic tape, an optical disc, or a hard disk.

The mastering device 500 is composed generally of a reading unit 510, a content encrypting unit 501, a signature unit 502, a media key acquiring unit 503, a media key encrypting unit 504, a physical formatting unit 505, an identifier writing unit 506, a mastering unit 507, a replication unit 508, and a verifier 509.

The reading unit 510 reads data recorded in the Type1-A or Type1-B format. In the case where the data is in the Type1-A format, the read data is transmitted to the content encrypting unit 501. On the other hand, in the case where the data is in the Type1-B format, the read data is transmitted to the signature unit 502. The reading unit 510 judges whether the read data is in the Type1-A or Type1-B format with reference to the format type information contained in the data. The format type information indicates one of the Type1-A, Type1-B, Type2-A, and Type2-B formats in which the data is recorded. The format type information is stored in the lead-in area, for example.

The content encrypting unit 501 is identical in function to the content encrypting unit 404 of the authoring device 400. The signature unit 502 requests the AACS LA 600 for a digital signature. More specifically, the signature unit extracts part of the content and sends the extracted part of the content to the AACS LA 600 to eventually receive the part of the content signed by the AACS LA 600.

The media key acquiring unit 503 periodically acquires a new media key from the AACS LA 600. This is because the number of discs permitted to be produced using a single media key is limited. Thus, it is not true that one and the same media key is used at all times. Rather, when the number of disks produced using one media key reaches the maximum number permitted, the media key is renewed. By periodically updating the media key, it is possible to prohibit specific manufactures and devices from using the media key. Thus, even in the event that an encryption key is exposed, it is possible to revoke the encryption key per se.

The media key encrypting unit 504 encrypts a key used to encrypt the content, by using the media key acquired by the media key acquiring unit 503.

The physical formatting unit 505 carries out physical formatting.

The identifier writing unit 506 has an unique identifier that is not detectable and writes the identifier into the content that is to be stored on BD-ROM. This arrangement prevents mass-production of a pirated edition of the content generated as a result of unauthorized mastering.

The mastering unit 507 produces a master optical disc. First of all, the mastering unit 507 forms a layer of photo-resist on a glass substrate, and irradiates the photo-resist with a laser beam in order to develop a surface profile corresponding to the desired pits and grooves. Then, the master optical disc is produced using the photo-resist having the profile formed by laser-cutting described above.

The replication unit 508 mass produces optical discs, which are replications of the original master.

The verifier 509 verifies the behavior of each optical disc produced.

The AACS LA 600 is an organization that manages licenses for content protection on next-generation digital home appliances. The authoring device 400 and the mastering device 500 each obtain a license from the AACS LA 600, and the AACS LA 600 manages the media key and the revocation information.

<Operation>

Figure 8:
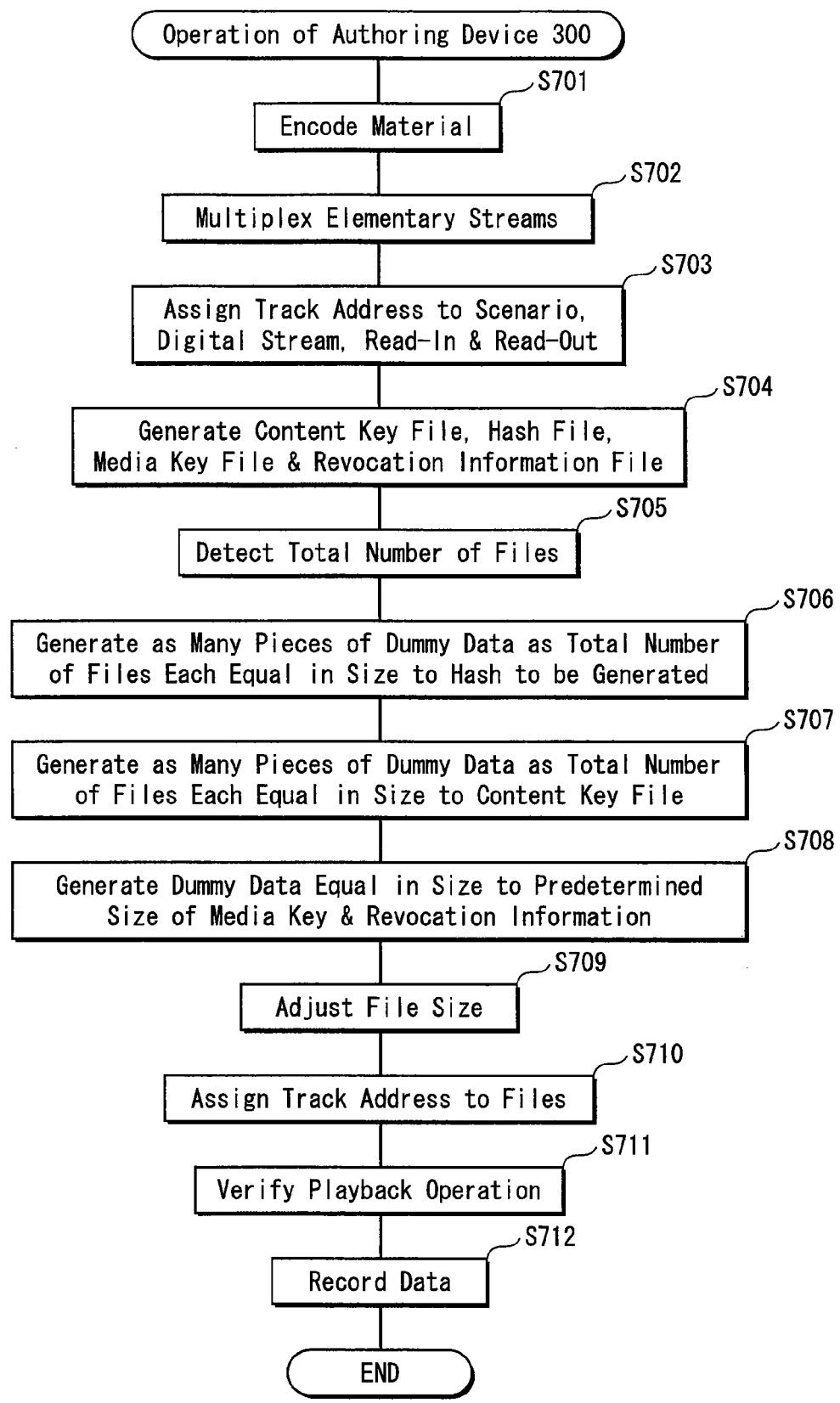
FIG. 8 is a flowchart of operation of an authoring device 300.

The following describes operation of the authoring device 300. FIG. 8 is a flowchart of operation of the authoring device 300.

First, the encoder 305 encodes material received from the studio 100 into a plurality of elementary streams (Step S701). The multiplexer 306 multiplexes the plurality of elementary streams into an MPEG2-TS digital stream (Step S702). The formatting unit 307 assigns addresses on the BD-ROM track, which spirals outwards, to the scenario supplied from the studio 100, to digital streams, and to lead-in and lead-out areas (Step S703). The dummy file generator 302 generates a content key file, a hash value file, a media key file, and a revocation information file (Step S704). Next, the dummy file generator 302 detects the total number of files (Step S705) and generates dummy data that is equal in size to as many hash values as the detected number of files (Step S706). In addition, the dummy file generator 302 generates dummy data that is equal in size to as many content keys as the detected number of files (Step S707). That is to say, the dummy file generator 302 generates in advance dummy data that is equal in size estimated to be increased as a result that hash values and content keys are generated.

In addition, the dummy file generator 302 generates dummy data that is equal to the fixed size of the media key and revocation information (Step S708). The dummy file generator 302 stores the respective pieces of dummy data generated in Steps S706-S708 to the files generated in Step S704, so that the size of the respective files are adjusted (Step S709). The dummy file generator 302 assigns track addresses to the respective pieces of dummy data (Step S710). The verifier 303 executes playback of the volume image to verify the correctness of the volume image (Step S711). After the volume image is verified, the recorder 304 records the data onto a recording medium (Step S712).

<Operation>

Figure 9:
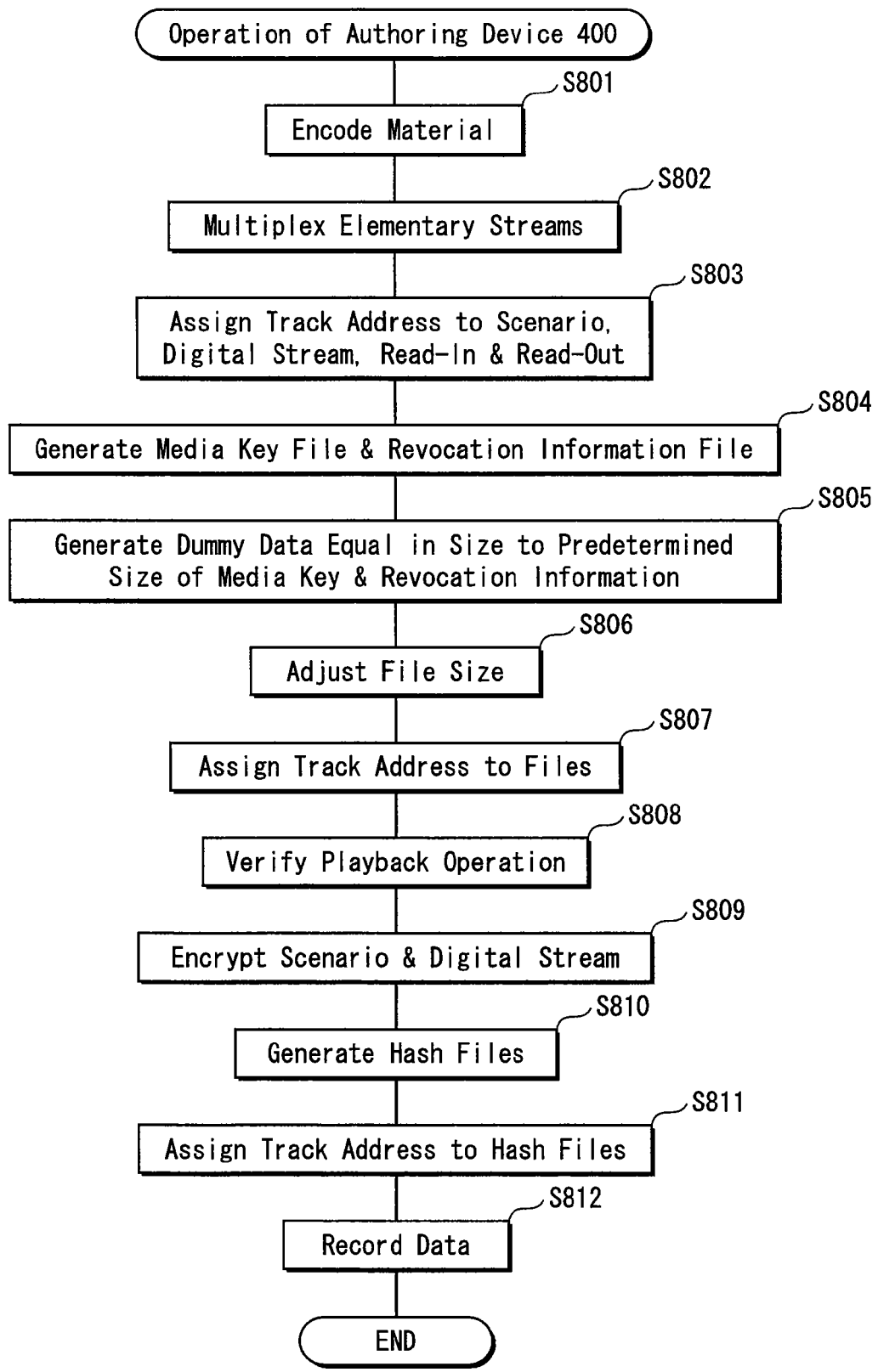
FIG. 9 is a flowchart of operation of an authoring device 400.

The following describes operation of the authoring device 400. FIG. 9 is a flowchart of operation of the authoring device 400.

First, the encoder 406 encodes material received from the studio 200 into a plurality of elementary streams (Step S801). The multiplexer 407 multiplexes the plurality of elementary streams into an MPEG2-TS digital stream (Step S802) The formatting unit 408 assigns addresses on the BD-ROM track, which spirals outwards, to the scenario supplied from the studio 200, to digital streams, and to lead-in and lead-out areas (Step S803). The dummy file generator 402 generates a media key file and a revocation information file (Step S804). Next, the dummy file generator 402 generates dummy data that is equal to the fixed size of the media key and revocation information (Step S805). The dummy file generator 402 stores the respective pieces of dummy data to the files generated in Step S804, so that the size of the respective files are adjusted (Step S806). The dummy file generator 402 assigns track addresses to the respective pieces of dummy data (Step S807). The verifier 403 executes playback of the volume image to verify the correctness of the volume image (Step S808).

Next, the content encrypting unit 404 generates a content key and encrypts the scenario and the digital stream with the thus generated content key (Step S809). Then, the content encrypting unit 404 generates hash values from the encrypted scenario and the encrypted digital stream (Step S810). The content encrypting unit 404 then assigns track addresses to the hash values (Step S811) and the recorder 405 records the data onto a recording medium (Step S812).

<Structure>

The authoring device 400 that outputs authoring data in the Type1-B format may be set so as to select one of the Type1-A and Type1-B formats and generate authoring data in the selected format.

Figure 10:
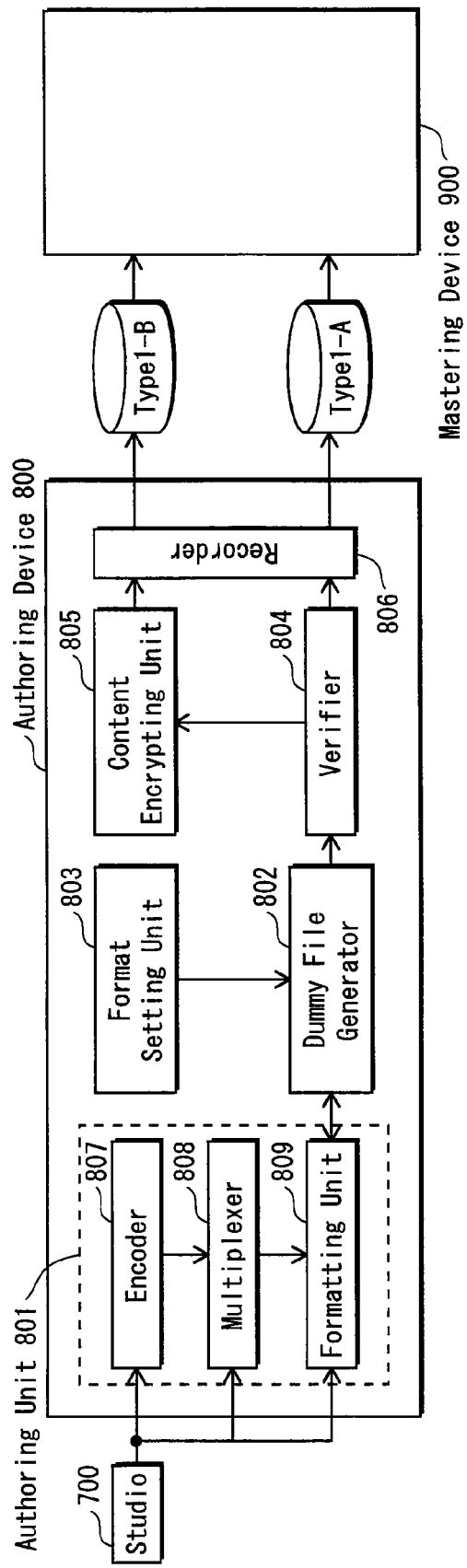
FIG. 10 illustrates the structure of another system according to the present invention and also illustrates the internal structure of devices included in the system.

An authoring device 800 is configured to make such selection. As illustrated in FIG. 10, the authoring device 800 includes a format setting unit 803, in addition to the component units of the authoring device 400 described above.

The format setting unit 803 holds information designating either of the Type1-A and Type1-B formats in accordance with a user operation.

A dummy file generator 802 judges whether the format setting unit holds information designating the Type1-A format or the Type1-B format. On judging that information designating the Type1-A format is held, the dummy file generator 802 operates in a similar manner to the dummy file generator 302 of the authoring device 300. On the other hand, on judging that information designating the Type1-B format is held, the dummy file generator 802 operates in a similar manner to the dummy file generator 402 of the authoring device 400.

The verifier 804 executes playback of the volume image in order to verify that the behavior of the volume image is correct. After the verification, the data is transmitted to a recorder 806 if the data is in the Type1-A format and to a content encrypting unit 805 if the data is in the Type1-B format.

On judging that information designating the Type1-A format is held, the authoring device 800 operates in a similar manner to the authoring device 300 as illustrated in FIG. 8. On the other hand, on judging that the information designating the Type1-B format is held, the authoring device 800 operates in a similar manner to the authoring device 400 as illustrated in FIG. 9.

As described above, the authoring device 800 is enabled to generate authoring data in either of the Type1-A and Type1-B formats.

<Structure>

Figure 11:
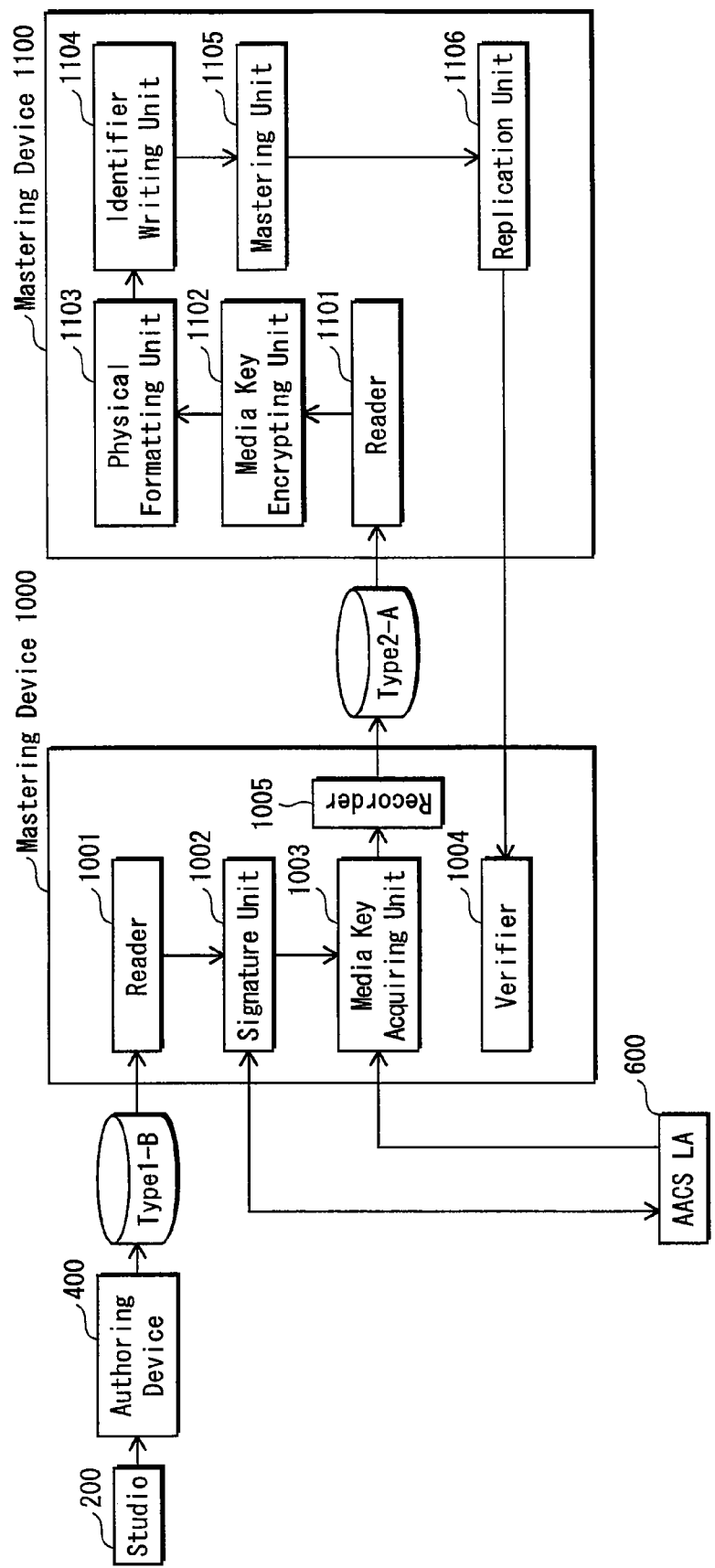
FIG. 11 illustrates the structure of yet another system according to the present invention and also illustrates the internal structure of devices included in the system.

The following describes a system in which the Type2-A format is employed. FIG. 11 illustrates the structure of a system that includes the studio 200, the authoring device 400, the AACS LA 600, and mastering devices 1000 and 1100.

The mastering device 1000 records, in the Type2-A format, data supplied from the authoring device 400.

The mastering device 1100 is a subcontractor to the mastering device 1000 and processes data supplied from the mastering device 1000.

FIG. 11 also illustrates the internal structure of the mastering devices 1000 and 1100 that are included in the system.

The mastering device 1000 is generally composed of a reading unit 1001, a signature unit 1002, a media key acquiring unit 1003, a verifier 1004, and a recorder 1005.

The reading unit 1001 reads data recorded in the Type1-B format and transmits the read data to the signature unit 1002.

The recorder 1005 records the data received from the media key acquiring unit 1003 onto a recording medium.

The signature unit 1002, the media key acquiring unit 1003, and the verifier 1004 are identical in function to a corresponding one of the signature unit 502, the media key acquiring unit 503, and the verifier 509.

With the above structure, the mastering unit 1000 is enabled to record data in the Type2-A format.

The mastering device 1100 is generally composed of a reading unit 1101, a media key encrypting unit 1102, a physical formatting unit 1103, an identifier writing unit 1104, a mastering unit 1105, and a replication unit 1106.

The reading unit 1101 reads data recorded in the Type2-A format and transmits the read data to the media key encrypting unit 1102.

The media key encrypting unit 1102, the physical formatting unit 1103, the identifier writing unit 1104, the mastering unit 1105, and the replication unit 1106 are identical in function to a corresponding one of the media key encrypting unit 504, the physical formatting unit 505, the identifier writing unit 506, the mastering unit 507, and the replication unit 508.

<Operation>

Figure 12:
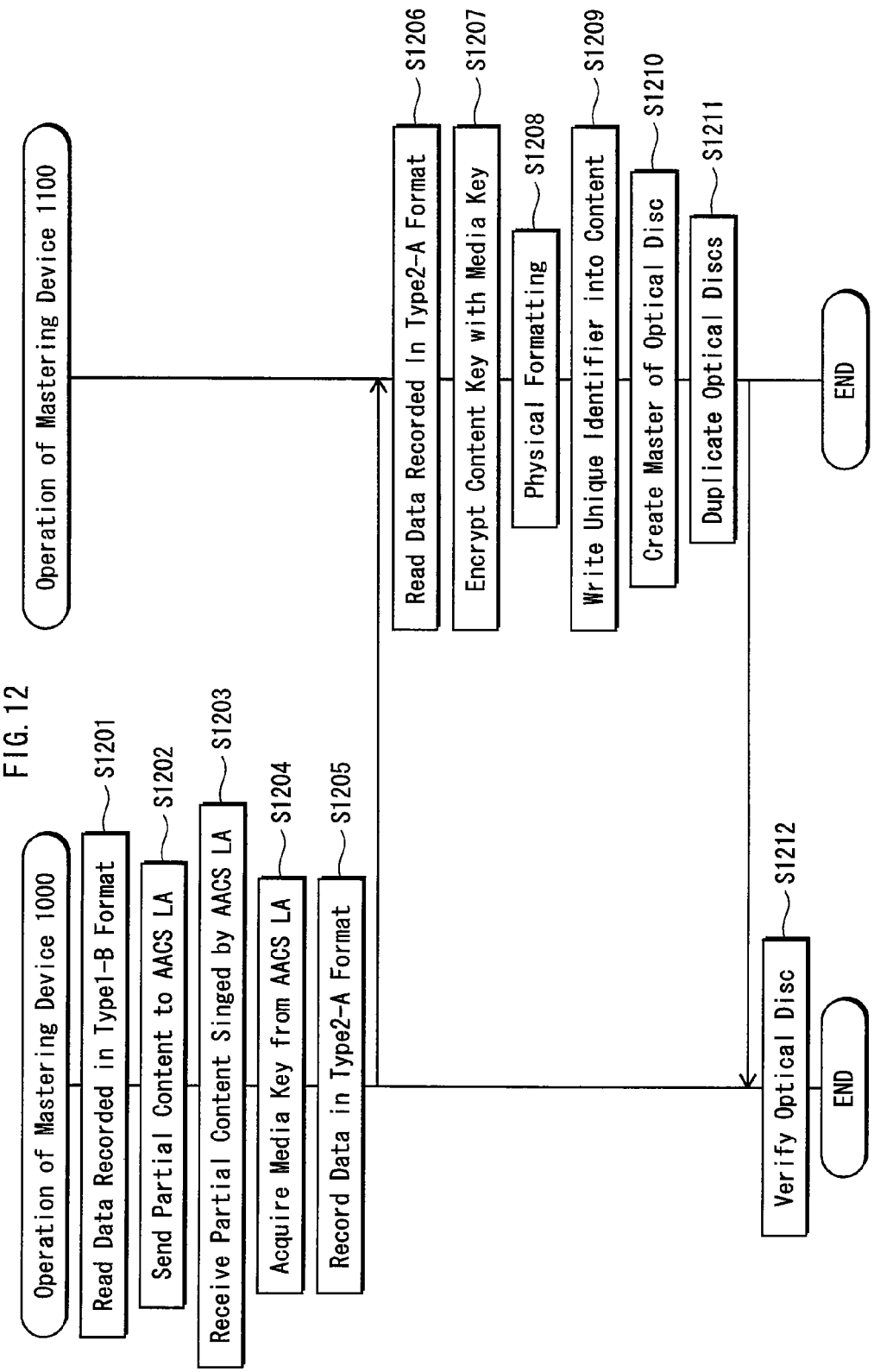
FIG. 12 is a flowchart of operation of mastering devices 1000 and 1100.

The following describes operation of the mastering devices 1000 and 1100. FIG. 12 is a flowchart of operation of the mastering devices 1000 and 1100.

First of all, the reading unit 1001 reads data recorded in the Type1-B format and transmits the read data to the signature unit 1002 (Step S1201). The signature unit 1002 issues a request for a signature to the AACS LA 600. More specifically, the signature unit 1002 extracts part of the content and transmits the extracted part of the content to the AACS LA (Step S1202). The signature unit 1002 then receives the part of the content signed by the AACS LA 600 (Step S1203). The media key acquiring unit 1003 periodically acquires a new media key from the AACS LA 600 (Step S1204). The recorder 1005 records the data transmitted from the media key acquiring unit 1003 onto a recording medium (Step S1205). Next, when the recording medium is supplied to the mastering device 1100, the reading unit 1101 reads the data recorded in the Type2-A format and transmits the read data to the media key encrypting unit 1102 (Step S1206). When the media key encrypting unit 1102 encrypts the content key (Step S1207), the physical formatting unit 1103 carries out physical formatting (Step S1208) and the identifier writing unit 1104 writes the unique identifier into the content (Step S1209). Then, the mastering unit 1105 produces a master optical disc (Step S1210) and the replication unit 1106 mass produces optical discs, which are replications of the master optical disc (Step S1211). Each of the thus produced optical discs is verified by the verifier 1004 of the mastering device 1000 (Step S1212).

<Structure>

Figure 13:
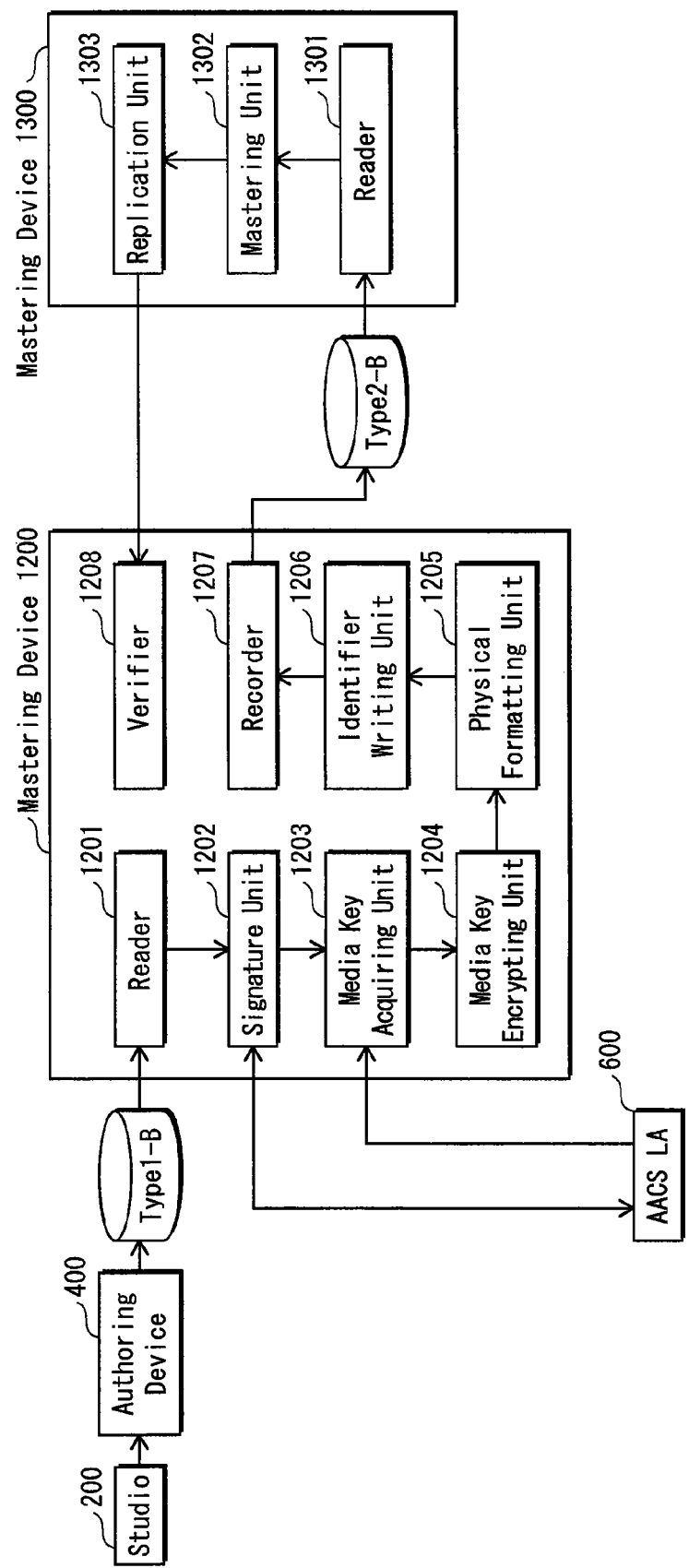
FIG. 13 illustrates the structure of yet another system according to the present invention and also illustrates the internal structure of devices included in the system.

The following describes the structure of a system in which the Type2-B format is used. FIG. 13 illustrates the structure of a system that includes the studio 200, the authoring device 400, the AACS LA 600, and mastering devices 1200 and 1300.

The mastering device 1200 records data supplied from the authoring device 400 in the Type2-B format.

The mastering device 1300 is a subcontractor to the mastering device 1200 and processes data supplied from the mastering device 1200.

FIG. 13 also illustrates the internal structure of the mastering devices 1200 and 1300.

The mastering device 1200 is generally composed of a reading unit 1201, a signature unit 1202, a media key acquiring unit 1203, a media key encrypting unit 1204, a physical formatting unit 1205, an identifier writing unit 1206, a recorder 1207, and a verifier 1208.

The recorder 1207 records data transmitted from the identifier writing unit 1206 onto a recording medium.

The reading unit 1201, the signature unit 1202, the media key acquiring unit 1203, the media key encrypting unit 1204, the physical formatting unit 1205, the identifier writing unit 1206, and the verifier 1208 are identical in function to a corresponding one of the reading unit 1005, the signature unit 1002, the media key acquiring unit 1003, the media key encrypting unit 1102, the physical formatting unit 1103, the identifier writing unit 1104, and the verifier 1004.

With the above structure, the mastering device 1200 is enabled to record data in the Type2-B format.

The mastering device 1300 is composed generally of a reading unit 1301, a mastering unit 1302, and a replication unit 1303.

The reading unit 1301 reads data recorded in the Type2-B format and transmits the read data to the mastering unit 1302.

The mastering unit 1302 and the replication unit 1303 are identical in function to a corresponding one of the mastering unit 507 and the replication unit 508.

<Operation>

The following describes operation of the mastering devices 1200 and 1300. FIG. 14 is a flowchart of operation of the mastering devices 1200 and 1300.

First of all, the reading unit 1201 reads data recorded in the Type1-B format and transmits the read data to the signature unit 1202 (Step S1301). The signature unit 1202 issues a request for a signature to the AACS LA 600. More specifically, the signature unit 1002 extracts part of the content and transmits the extracted part of the content to the AACS LA (Step S1302). The signature unit 1202 then receives the part of the content signed by the AACS LA 600 (Step S1303). The media key acquiring unit 1203 periodically acquires a new media key from the AACS LA 600 (Step S1304). The media key encrypting unit 1204 encrypts the content key with the media key (Step S1305). The physical formatting unit 1205 carries out physical formatting (Step S1306). The identifier writing unit 1206 writes the unique identifier into the content (Step S1307). The recorder 1207 records data transmitted from the identifier writing unit 1206 onto a recording medium (Step S1308). Next, when the recording medium is supplied to the mastering device 1300, the reading unit 1301 reads the data recorded in the Type2-B format (Step S1309) and transmits the read data to the mastering unit 1302 (Step S1310). The mastering unit 1302 produces a master optical disc (Step S1310) and the replication unit 1303 mass produces optical discs, which are replications of the master optical disc (Step S1311). Each of the thus produced optical discs is verified by the verifier 1208 of the mastering device 1200 (Step S1312).

(Modifications)

Up to this point, the embodiments of a recording medium according to the present invention have been described. It should be naturally appreciated, however, that the present invention is not limited to the specific embodiments described above.

Physically, each of the above devices is a computer system composed of a microprocessor, ROM, RAM, hard disk unit, display unit, keyboard, mouse, and possibly other components. The RAM or hard disk unit stores a computer program. The microprocessor operates in accordance with the computer program, so that each device carries out the respective functions. The computer program is a combination of instruction codes for causing the computer to carry out the predetermined functions.

Some or all of the unit components of each device described above may be implemented in a single system LSI (Large Scale Integration) circuit. The system LSI is a large scale integrated circuit composed of multiple modules fabricated on a single chip. Specifically, the system LSI is a computer system composed of a microprocessor, ROM, RAM, and possibly other components. The RAM stores a computer program. The microprocessor operates in accordance with the computer program, so that the system LSI carries out its functions.

Some or all of the unit components of each device described above may be implemented in an IC card detachable from the respective device or in a single module. The IC card or module is a computer system composed of a microprocessor, ROM, RAM, and possibly other components. The IC card or module may include the large scale integrated circuit mentioned above. The microprocessor operates in accordance with the computer program, so that the IC card or module carries out its functions. In addition, the IC card or module may be made tamper-resistant.

The present invention may be embodied as any of the methods described above.

All the functional blocks of any of the devices described in the above embodiment may be implemented as an LSI which is an integrated circuit and this still falls within the scope of the present invention. In addition, only part of the functional blocks rather than all the functional blocks may be implemented as an LSI and this still falls within the scope of the present invention. The functional blocks may be implemented into separate chips. Alternatively, all or part of the functional blocks may be implemented into a singe chip. In addition, although an LSI is specifically mentioned above, the circuit may be referred to as IC, system LSI, super LSI, or ultra LSI, depending on the packaging density.

In addition, an integrated circuit may be fabricated not only by way of LSI. The integrated circuit may be implemented by a dedicated circuit or a general-purpose processor. For example, it is applicable to use an FPGA (Field Programmable Gate Array) that enables post-manufacturing programming of an LSI circuit. It is also applicable to use a reconfigurable processor that allows reconfiguration of connection between circuit cells within an LSI circuit and their settings.

When any new circuit integration technology becomes available or derived as the semiconductor technology advances, such new technology may be employed to integrate the functional blocks of the present invention. One possible candidate of such new technology may be achieved by adapting biotechnology.

According to the above embodiments, the authoring device is configured to output data in any of the Type1-A and Type1-B formats. However, the authoring device may be configured to output data in any of the Type2-A and Type2-B formats. That is, the authoring device may be configured to include the signature unit and the media key acquiring unit. Furthermore, the authoring device may be configured to additionally include the media key encrypting unit, the formatting unit, and the identifier writing unit. In such a case, it is no longer necessary for the mastering site to hold an AACS license. Thus, the Type2-A and Type2-B formats are especially useful in the case where the mastering site is without an AACS license.

According to the above embodiments illustrated in FIGS. 11 and 13, the authoring device 400 outputs data to the mastering device in the Type1-B format. Alternatively, however, data may be outputted to the mastering device in the Type1-A format. In such a case, the mastering device is configured to include the content encrypting unit.

The present invention may be embodied as any combination of the above-described embodiments and modifications.

INDUSTRIAL APPLICABILITY

Recording mediums according to the present invention can be manufactured and soled in the industrial field of manufacturing on a commercial, continuous and repetitive basis. Recording mediums according to the present invention are especially promising as recording mediums used for Blu-ray disc authoring.

The invention claimed is:

1. A non-transitory computer readable recording medium used for transferring authoring data between a plurality of sites including an authoring site and a mastering site, wherein:

the authoring data has a directory structure in which a movie directory and a copyright protection directory are located below a root directory, at least three sub-directories are located below the movie directory, and the at least three sub-directories are a stream directory, a stream information directory, and a playlist information directory, the authoring data includes a content, and the content included in the authoring data includes:

a movie object and an index table that are stored in the movie directory;

an audio/video stream that is stored in the stream directory;

stream information that is stored in the stream information directory; and playlist information that is stored in the playlist information directory, and the copyright protection directory stores a content key for encrypting the content, a hash value of the content, a media key for encrypting the content key, and revocation information for revoking an unauthorized device from using the media key, the authoring data has a plurality of formats, the plurality of formats include a first format and a second format, in the first format, the content is not encrypted, and each of the content key, the hash value, the media key, the revocation information is dummy data, and in the second format, the content is encrypted and each of the media key and the revocation information is dummy data, and each of the content key, the hash value, the media key, the revocation information being dummy data is equal in size to a corresponding one of the content key, the hash value, the media key, the revocation information, so that a total size of the authoring data in the first format is equal to a total size of the authoring data in the second format.

2. The non-transitory computer readable recording medium according to claim 1, wherein the plurality of formats include a third format and a fourth format, in the third format, the content is encrypted, the content key is not encrypted, and each of the media key and the revocation information is actual data, and in the fourth format, both the content and the content key are encrypted.

3. An authoring device for generating and recording authoring data onto a non-transitory recording medium that is used for transferring the authoring data to a mastering site, the authoring device comprising:

an encoder that obtains an elementary stream by encoding;

a multiplexer that obtains the elementary stream by multiplexing the elementary stream;

a formatting unit that obtains the authoring data including a content, based on a digital stream;

a signature acquiring unit that (i) requests an administrator to sign at least part of the content and (ii) acquires, from the administrator, data resulting from the signing, wherein the authoring data has a directory structure in which a movie directory and a copyright protection directory are located below a root directory, at least three sub-directories are located below the movie directory, and the at least three sub-directories are a stream directory, a stream information directory, and a playlist information directory, the authoring data includes the content, and the content included in the authoring data includes:

a movie object and an index table that are stored in the movie directory;

an audio/video stream that is stored in the stream directory;

stream information that is stored in the stream information directory; and playlist information that is stored in the playlist information directory, and the copyright protection directory stores a content key for encrypting the content, a hash value of the content, a media key for encrypting the content key, and revocation information for revoking an unauthorized device from using the media key, the authoring data has a plurality of formats, the plurality of formats include a first format and a second format, in the first format, the content is not encrypted, and each of the content key, the hash value, the media key, the revocation information is dummy data, and in the second format, the content is encrypted and each of the media key and the revocation information is dummy data, and each of the content key, the hash value, the media key, the revocation information being dummy data is equal in size to a corresponding one of the content key, the hash value, the media key, the revocation information, so that a total size of the authoring data in the first format is equal to a total size of the authoring data in the second format.

4. The authoring device according to claim 3, further comprising:

an encrypting unit operable to generate the content key, to encrypt the content with the content key, and to generate the hash of the encrypted content;

a media key acquiring unit that periodically acquires the media key and obtains the revocation information from the administrator; and a recording unit operable to record the authoring data onto the non-transitory computer readable recording medium, wherein the content included in the authoring data recorded on the computer readable recording medium has been signed by the administrator and encrypted by the encrypting unit.

5. The authoring device according to claim 4, further comprising:

a media key encrypting unit that encrypts the content key with the media key acquired by the media key acquiring unit, wherein the content key included in the authoring data recorded on the computer readable recording medium has been encrypted by the media key encrypting unit.

6. An authoring method to be executed on a device and for generating and recording authoring data onto a non-transitory computer readable recording medium that is used for transferring the authoring data to a mastering site, the device including:

an encoder that obtains an elementary stream by encoding;

a multiplexer that obtains the elementary stream by multiplexing the elementary stream; and a formatting unit that obtains the authoring data including a content, based on a digital stream;

the authoring data having a directory structure in which a movie directory and a copyright protection directory are located below a root directory, at least three sub-directories are located below the movie directory, and the at least three sub-directories are a stream directory, a stream information directory, and a playlist information directory, the authoring data includes the content, and the content included in the authoring data includes:
- a movie object and an index table that are stored in the movie directory;
- an audio/video stream that is stored in the stream directory;
- stream information that is stored in the stream information directory; and
- playlist information that is stored in the playlist information directory, and the copyright protection directory stores a content key for encrypting the content, a hash value of the content, a media key for encrypting the content key, and revocation information for revoking an unauthorized device from using the media key, the authoring data has a plurality of formats, the plurality of formats include a first format and a second format, in the first format, the content is not encrypted, and each of the content key, the hash value, the media key, the revocation information is dummy data, and in the second format, the content is encrypted and each of the media key and the revocation information is dummy data, and each of the content key, the hash value, the media key, the revocation information being dummy data is equal in size to a corresponding one of the content key, the hash value, the media key, the revocation information, so that a total size of the authoring data in the first format is equal to a total size of the authoring data in the second format.

* * * * *